United States Patent [19]

Briggs et al.

[11] Patent Number: 5,765,672
[45] Date of Patent: Jun. 16, 1998

[54] OVERHEATING PROTECTION DEVICE FOR ROTATIONAL CONTROL APPARATUS

[75] Inventors: Bradley R. Briggs, Eagan; William R. Daniels, New Germany, both of Minn.; Charles M. Bastien, River Falls, Wis.

[73] Assignee: Horton, Inc., Minneapolis, Minn.

[21] Appl. No.: 698,780

[22] Filed: Aug. 16, 1996

[51] Int. Cl.⁶ ............... F16D 43/28; F01P 7/02
[52] U.S. Cl. ............... 192/85 R; 123/41.11; 192/101; 192/150; 416/32; 416/40
[58] Field of Search ............... 192/150, 56.1, 192/56.3, 85 R, 82 T; 123/41.11, 41.12; 416/32 R, 32 A, 40

[56] References Cited

U.S. PATENT DOCUMENTS

| | | |
|---|---|---|
| 2,211,971 | 8/1940 | Flanders . |
| 2,798,465 | 7/1957 | Nicholson . |
| 4,393,966 | 7/1983 | Kono et al. ............ 192/150 X |
| 4,877,118 | 10/1989 | Tamura ............ 192/150 X |
| 5,188,136 | 2/1993 | Kumagai . |
| 5,380,244 | 1/1995 | Tipton . |
| 5,398,794 | 3/1995 | Walberg et al. . |
| 5,401,212 | 3/1995 | Marvell et al. . |

Primary Examiner—Rodney H. Bonck
Attorney, Agent, or Firm—Peterson, Wicks, Nemer & Kamrath, PA; Alan D. Kamrath

[57] ABSTRACT

A device (10) is disclosed for intercepting the input of a system (23) of an internal combustion engine (12) normally provided to a solenoid valve (22) for actuating a fan clutch (20) when rotation of a fan (16) is desired. The input is received by terminals (42, 43) and is conditioned and passed on to a timer (96) and a controller (97). A vacuum switch (24) senses whether the fan (16) is rotating and provides a second input to the controller (97). In the event that an input is provided by the system (23) and the time delay signal has been provided by the timer (96) and also in the event that an input is provided by the system (23), the time delay has expired, and the second input is provided by the vacuum switch (24), the controller (97) provides an actuation output to terminals (71, 73) connected to the solenoid valve (22) by use of actuation provisions (98) to actuate the fan clutch (20). After the time delay signal is no longer provided by the timer (96), the actuation output is interrupted to the fan clutch (20) if one or both of the first and second inputs are interrupted. Thus, device (10) interrupts the actuation of the fan clutch (20) in the event that the fan (16) is unable to rotate for any reason and thereby provides overheating protection for the fan clutch (20).

34 Claims, 2 Drawing Sheets

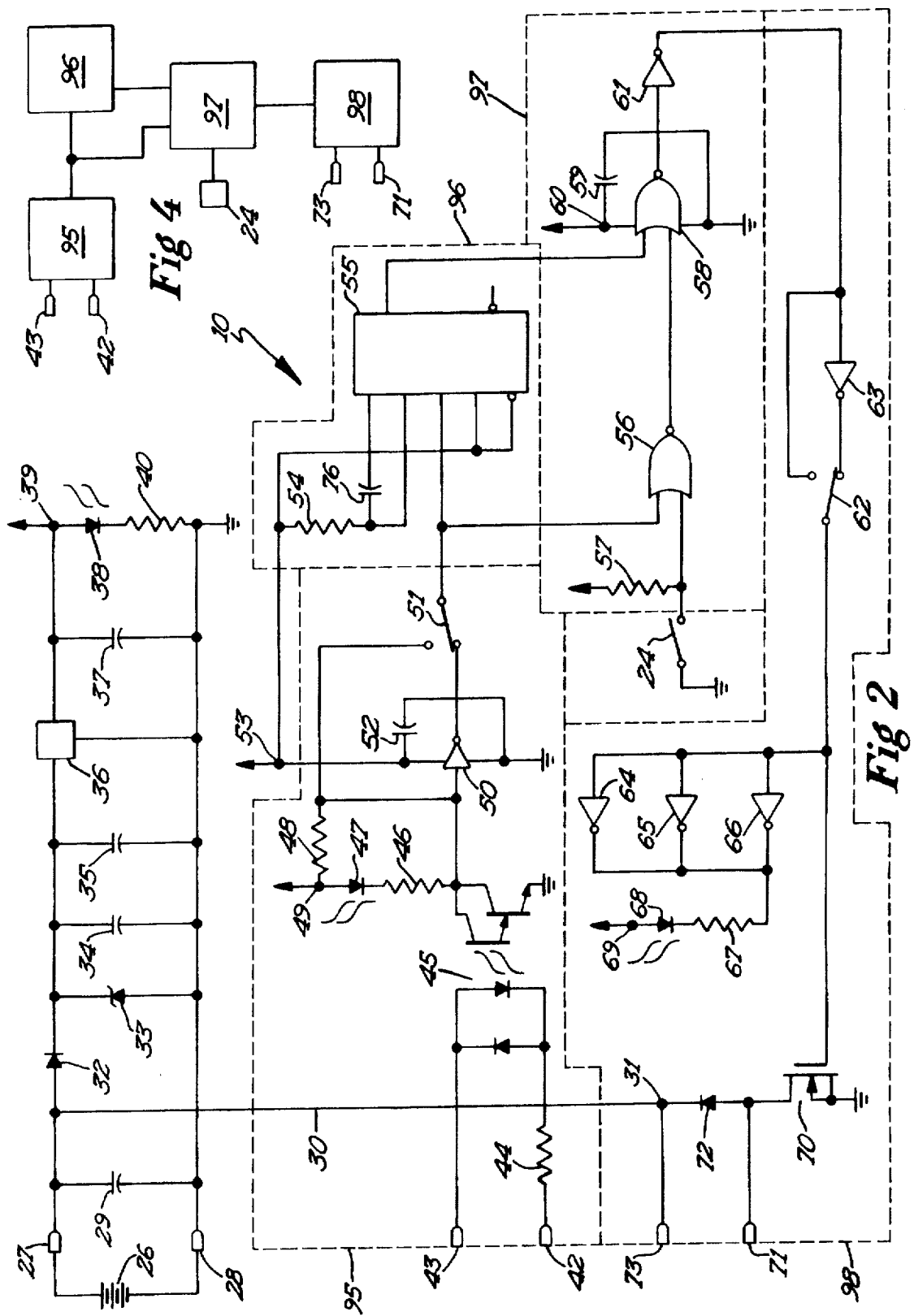

5,765,672

OVERHEATING PROTECTION DEVICE FOR ROTATIONAL CONTROL APPARATUS

BACKGROUND

The present invention generally relates to overheating protection devices for rotational control apparatus and especially for rotational control apparatus for controlling air flow, specifically to overheating protection devices for fan clutches, and particularly to overheating protection devices for fan clutches for internal combustion engines.

U.S. Pat. No. 5,398,794 discloses an overheating protection device in the form of a thermal fuse for a fan clutch. Retrofitting existing fan clutches with the thermal fuse of U.S. Pat. No. 5,398,794 would be possible but generally may not be very practical because of the large number of types and configurations of existing fan clutches. Thus, a need continues to exist for overheating protection devices which may be more easily retrofitted for use with existing fan clutches to remove the risk of reduced operational life for the friction interface disc, the friction facing, and other clutch components and to remove the risk of overheating of surrounding cooling components such as the fan belts as the result of interface slippage in the fan clutch if the fan were unable to rotate.

SUMMARY

The present invention solves this need and other problems in the field of overheating protection devices for rotational control apparatus by providing, in the preferred form, interruption of the actuation of the rotational control apparatus in the event that rotation of the output of the rotational control apparatus is not sensed.

In other aspects of the present invention, the rotation of a fan is interrupted in the event that a pressure change is not sensed inside the shroud of a radiator for an internal combustion engine. In preferred forms, the pressure change is sensed through the use of a vacuum switch and rotation of the fan is interrupted by deactivating a fan clutch while the clutch input continues to rotate.

It is thus an object of the present invention to provide a novel device for protecting rotational control apparatus from overheating.

It is further an object of the present invention to provide such a novel overheating protection device for an internal combustion engine.

It is further an object of the present invention to provide such a novel overheating protection device for a clutch.

It is further an object of the present invention to provide such a novel overheating protection device for a fan clutch for an internal combustion engine.

It is further an object of the present invention to provide such a novel overheating protection device which may be easily retrofitted in many existing environments.

It is further an object of the present invention to provide such a novel overheating protection device operable both for apparatus actuable by providing an input signal or by interrupting an input signal.

It is further an object of the present invention to provide such a novel overheating protection device operable with both a fluid actuated apparatus which is fluid engaged or fluid disengaged.

It is further an object of the present invention to provide such a novel overheating protection device operable with both a normally open or a normally closed solenoid for a fluid actuated apparatus.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows an electrical schematic for the overheating protection device of FIG. 1.

FIG. 4 shows a diagramatic block diagram of the electrical schematic of FIG. 2.

Figure 1:
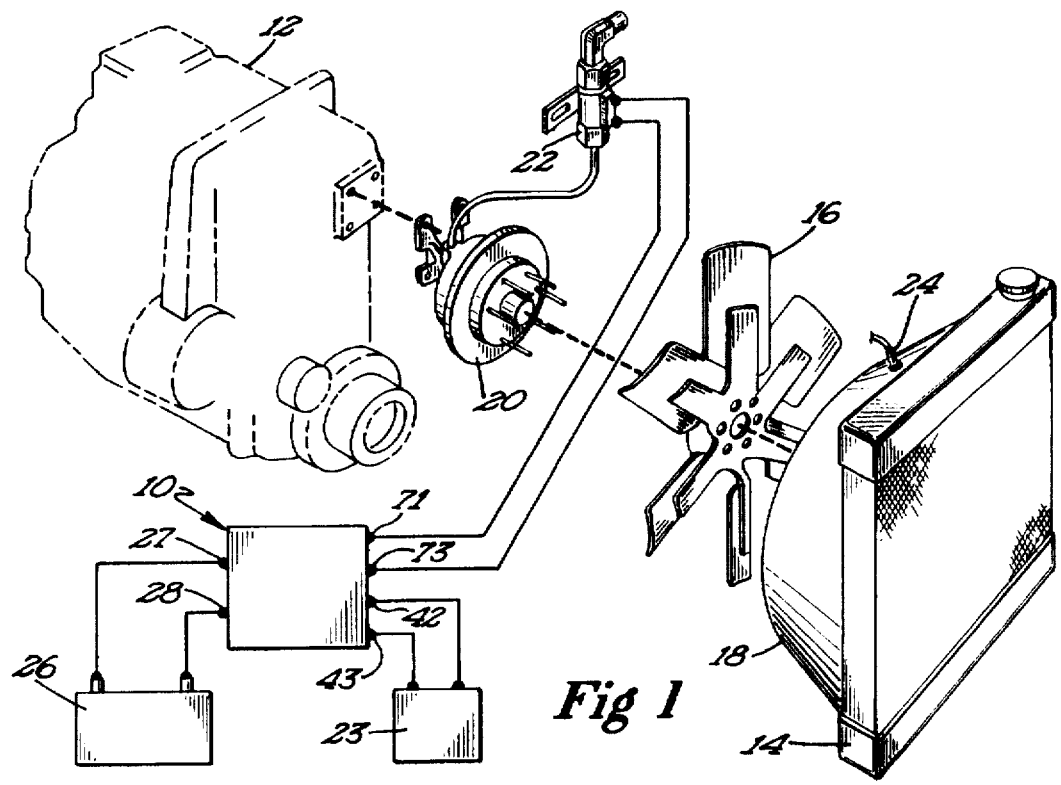
FIG. 1 shows a diagramatic view of an overheating protection device for a fan clutch for an internal combustion engine according to the preferred teachings of the present invention.

All figures are drawn for ease of explanation of he basic teachings of the present invention only; the extensions of the Figures with respect to number, position, relationship, and dimensions of the parts to form the preferred embodiment will be explained or will be within the skill of the art after the following description has been read and understood. Further, the exact values, dimensions and dimensional proportions to conform to specific electronic, electrical, force, weight, strength, and similar requirements will likewise be within the skill of the art after the following description has been read and understood.

Where used in the various figures of the drawings, the same numerals designate the same or similar parts. Furthermore, when the terms "first", "second", "radial", and similar terms are used herein, it should be understood that these terms have reference only to the structure shown in the drawings as it would appear to a person viewing the drawings and are utilized only to facilitate describing the illustrative embodiment.

DESCRIPTION

An overheating protection device for a fan clutch for an internal combustion engine such as for a truck, bus, or the like according to the preferred teachings of the present invention is shown in the drawings and generally designated 10. A common mode of providing power to a truck, bus, or the like is an internal combustion engine 12 having a cooling system generally including a radiator 14 through which coolant is circulated. A fan 16 is provided for moving air through radiator 14 in a direction either drawing or pushing air through radiator 14. For directing air flow, fan 16 is positioned generally radially centrally within a shroud 18 secured to radiator 14. As cooling requirements of engine 12 vary according to various factors including but not limited to ambient air temperature and speed, engine speed, and the like, it is common to provide a fan clutch 20 in the drive for fan 16 so that rotation of fan 16 can be varied according to the particular cooling requirements at any particular time. Fan clutch 20 includes a rotating input and a rotatable output for rotating fan 16 such as being mounted thereon. Fan clutch 20 is actuable from a disengaged condition where the input is free to rotate independent of the output to an engaged condition where the input is rotatably connected to the output such as directly. Fan clutch 20 can be actuated by any suitable means such as pneumatically or electrically. For purposes of explanation, fan clutch 20 will be of a fluid actuated type such as disclosed in U.S. Pat. Nos. 3,253,687;

3,409,305; 3,762,517; 4,226,095; 4,355,710; 4,425,993; 4,427,102; 4,445,605; 4,456,110; 4,460,079; 4,657,126; 4,877,117; and 5,059,161, which are hereby incorporated herein by reference. In the case of fluid actuation, a solenoid valve 22 controls fluid flow to fan clutch 20 to either activate or deactivate fan clutch 20. Solenoid valve 22 can be controlled by an electrical system 23 such as an electronic control module, a thermostat switch, or similar device. Device 10 is intended to work with valves 22 which are either normally closed or normally open and to work with fan clutches 20 which are either fluid engaged or disengaged. For example, if valve 22 is normally closed and fan clutch 20 is spring disengaged, current must be supplied to valve 22 to open valve 22 allowing fluid pressure to engage clutch 20 thus causing fan 16 to rotate. Likewise, if valve 22 is normally open and fan clutch 20 is spring disengaged, current must be interrupted to valve 22 for valve 22 to be open allowing fluid pressure to engage clutch 20 thus causing fan 16 to rotate. On the other hand, if fan clutch 20 is spring engaged and valve 22 is normally closed, current must be interrupted to valve 22 to remain closed allowing the spring bias to engage fan clutch 20 thus causing fan 16 to rotate. Likewise, if fan clutch 20 is spring engaged and valve 22 is normally open, current must be supplied to valve 22 to close valve 22 and allowing the spring bias to engage fan clutch 20 thus causing fan 16 to rotate.

More particularly, in the present invention, it has been found that a space is defined inside of shroud 18 and between fan 16 and radiator 14 which is generally at atmospheric pressure when fan 16 is not rotating. However, when fan 16 rotates, pressure inside of shroud 18 changes from the ambient pressure outside of shroud 18 due to the restriction of air flow by radiator 14. Device 10, according to the teachings of the present invention, senses whether air is moving through shroud 18 due to rotation of fan 16 by means of this change in pressure in shroud 18 to thereby sense whether the output of fan clutch 20 and fan 16 are rotating. Specifically, in the preferred form, assuming that air is being drawn through radiator 14, the pressure inside of shroud 18 will be less than atmospheric such that a slight vacuum exists in the space within shroud 18. This vacuum pressure has been measured on FREIGHTLINER® trucks to be in the range of 1 to 2 inches (2.5 to 5 cm) of water. This vacuum pressure is sensed, in the preferred form, by a vacuum switch 24 having one port open to atmospheric conditions and the other port connected to the inside of shroud 18 such as via a vacuum hose extending through shroud 18. In the most preferred form, switch 24 is actuated or rendered closed when a vacuum difference of greater than approximately 0.5 inches (1.3 cm) of water is sensed across it. Testing has shown that air entering shroud 18 as the result of a truck moving down the road will not be sufficient to close switch 24 to produce a false indication of rotation of fan 16.

Device 10, according to the preferred teachings of the present invention, operates with the 12 volt electrical system of engine 12 which includes a voltage source 26 such as a battery connected to supply terminals 27 and 28 by conventional electrical wires. A 0.01 microfarad capacitor 29 for attenuating electrical noise is connected between terminals 27 and 28. Terminal 27 is further connected by an electrical lead 30 to a junction point 31 and to the anode of diode 32 used for preventing damage from polarity reversal of voltage source 26. Diode 32 is of the axial rectifier, standard recovery type. The cathode of diode 32 is connected to the cathode of diode 33 of a transient voltage suppressor type and used to clamp fast acting voltage spikes to levels that other components can handle. The cathode of diode 32 is also connected to the positive terminal of a ten microfarad capacitor 34, the supply terminal of a 0.1 microfarad capacitor 35, and the input terminal of a fixed voltage regulator 36. Voltage regulator 36 converts the 12 volts supplied by source 26 to +5 volts that is used by most of the other components. The output terminal of voltage regulator 36 is connected to the positive terminal of a 330 microfarad capacitor 37 for attenuating electrical noise and as a voltage reservoir in case of sudden load demands placed on voltage regulator 36. The output terminal of voltage regulator 36 is also connected to the anode of a light emitting diode 38 which turns on when +5 volts are present for trouble shooting purposes. Also, the output terminal of voltage regulator 36 is connected to a junction point 39 from which +5 volt supply of voltage regulator 36 can be accessed if desired. The cathode of diode 38 is connected to ground through a one-eighth watt, 390 ohm resistor 40 for limiting current through diode 38. Terminal 28 is commonly connected to the ground terminal of resistor 40, the negative terminal of capacitor 37, the ground terminal of voltage regulator 36, the ground terminal of capacitor 35, the negative terminal of capacitor 34, the anode of diode 33, the ground terminal of capacitor 29, and the common of voltage source 36.

An actuation input or clutch request signal is provided by system 23 across terminals 42 and 43, with device 10 thereby intercepting the actuation input conventionally provided by system 23 to valve 22 to actuate fan clutch 20. Terminal 42 is connected to a one-fourth watt, two kilohm resistor 44. Terminal 43 is connected to the anode/cathode terminal of an opto-isolator 45. In the most preferred form, opto-isolator 45 is manufactured by NEC Corporation of Japan under part number PS2506-1. Resistor 44 is connected to the cathode/anode terminal of opto-isolator 45. Opto-isolator 45 isolates the signal applied across terminals 42 and 43 from the other components and prevents the power systems of device 10 from interacting with system 23. Opto-isolator 45 includes bi-directional light emitting diodes that allow terminals 42 and 43 to be connected without regard to polarity. The emitter terminal of opto-isolator 45 is connected to the common of voltage source 36. The output of opto-isolator 45 is a darlington pair transistor arrangement which makes it possible to switch more current with a smaller current input (higher current transfer ratio). The collector terminal of opto-isolator 45 is connected to a one-eighth watt, 390 ohm resistor 46 which in turn is connected to the cathode of light emitting diode 47 for indicating when current flows through terminals 42 and 43. Resistor 46 limits current through diode 47. The anode of diode 47 is connected to a pull up, one-eighth watt, two kilohm resistor 48. Also, the anode of diode 47 is connected to a junction point 49 from which +5 volt supply can be accessed. Resistor 48 is connected to the collector terminal of opto-isolator 45. The collector terminal of opto-isolator 45 is connected to the input terminal of an inverter gate 50 that takes the logic level present at the collector terminal of opto-isolator 45 and inverts it. The collector terminal of opto-isolator 45 is connected to the first input terminal of an input logic switch 51 in the preferred form of a sealed, toggle type. The output terminal of inverter gate 50 is connected to the second input terminal of an input logic switch 51. The DC supply-voltage terminal of inverter gate 50 is connected to the supply terminal of a 0.1 microfarad capacitor 52. The ground terminal of capacitor 52 is connected to the ground terminal of inverter gate 50 which in turn is connected to the common of voltage source 36. The DC supply-voltage terminal of inverter gate 50 is connected to a junction point 53 from which +5 volt supply can be accessed. The DC supply-voltage terminal of inverter gate 50 is connected to a one-eighth, 1 megohm resistor 54 and the leading-edge triggering input terminal and the active low reset terminal of a dual retriggerable monostable, one shot (with reset), multivibrator 55. In the most preferred form, multivibrator 55 is industry standard part number 74HC123. Resistor 54 is connected to the resistor/capacitor network input terminal of multivibrator 55 and to the positive terminal of a 10 microfarad capacitor 76. The negative terminal of capacitor 76 is connected to the capacitor input terminal of multivibrator 55. The common terminal of input logic switch 51 is connected to the trailing edge triggering input terminal of multivibrator 55.

Switch 51 makes it possible for device 10 to work with system 23 which supplies or interrupts current between terminals 42 and 43 when cooling is desired. Specifically, switch 51 is utilized to select between the first input and common terminals where current through terminals 42 and 43 indicate that it is desired to engage fan clutch 20 and between the second input and common terminals where lack of current through terminals 42 and 43 indicate that it is desired to engage fan clutch 20. The output of switch 51 is used to trigger the timer function and as an input into the logic portion of device 10. When current flows through or a voltage is provided across terminals 42 and 43, then the transistor output of opto-isolator 45 switches on and conducts current to ground. This results in any component connected to the collector terminal of opto-isolator 45 being grounded. As a result, diode 47, resistor 48, and switch 51 connecting the first input and common terminals of switch 51 is pulled to ground. When current through or a voltage across terminals 42 and 43 is interrupted, the transistor output of opto-isolator 45 is switched off and all components connected to the collector terminal of opto-isolator 45 are now at +5 volts because of pull up resistor 48.

Multivibrator 55 performs a timer delay function to allow fan 16 to come up to speed before device 10 looks to the output of vacuum switch 24. The length of the time delay is determined by the values of resistor 54 and capacitor 76 and in the preferred form is in the range of 4 to 6 seconds. A negative transitioning signal on the trailing-edge triggering input terminal of multivibrator 55 starts the time delay. Immediately, the output timing terminal of multivibrator 55 goes to a logic high (+5 volts) for the length of the time delay. After the time delay, the output timing terminal of multivibrator 55 goes low again.

The common terminal of switch 51 is connected to the first input terminal of a two input, exclusive-or logic NOR gate 56. Vacuum switch 24 is connected between the common of voltage source 36 and the second input terminal of gate 56 and also to a one-eighth watt, 510 ohm resistor 57 so that when switch 24 is closed, they are grounded. When switch 24 is open, resistor 57 pulls the second input terminal of gate 56 high (+5 volts). The logic of gate 56 works as follows: with both the first and second input terminals low, the output terminal will be high while any other combination at the first and second input terminals produces a low output at the output terminal of gate 56. Therefore, with switch 51 connecting the first input and common terminals and current flowing through terminals 42 and 43, the logic state of the first input terminal of gate 56 will be low. Also, if switch 24 is closed, the logic state of the second input terminal of gate 56 will be low. Thus, the combination of a clutch request and the sensing of fan rotation by switch 24 will cause the output terminal of gate 56 to be high. However, if current is interrupted through terminals 42 and 43 and/or switch 24 is open, the output terminal of gate 56 will go low.

The output timing terminal of multivibrator 55 is connected to the first terminal of an exclusive-or logic gate 58. The output terminal of gate 56 is connected to the second input terminal of gate 58. The purpose of gate 58 is to allow the output of multivibrator 55 to overrule vacuum switch 24. Specifically, switch 24 is overruled when the second input terminal of switch 51 goes low and causes multivibrator 55 to begin its time delay when the output timing terminal of multivibrator 55 is at a logic high. Due to the connection between the output timing terminal of multivibrator 55 and the first input terminal of gate 58, a logic high at the output timing terminal of multivibrator 55 causes the output terminal of gate 58 to go low and as long as the output timing terminal of multivibrator 55 remains high, the output terminal of gate 56 does not matter. Hence, the condition of switch 24 can not effect gate 58 at the output terminal. But, this is only temporary as once the time delay expires, the output timing terminal of multivibrator 55 goes low and the condition of switch 24 does matter.

The DC supply-voltage terminal of gate 58 is connected to the supply terminal of a 0.1 microfarad capacitor 59. Also, the DC supply-voltage terminal of gate 58 is connected to a junction point 60 from which +5 volt supply can be accessed. The ground terminal of capacitor 59 is connected to the ground terminal of gate 58 which in turn is connected to the common of voltage source 36. The output terminal of gate 58 is connected to an inverter gate 61 for inverting the output of gate 58. The output of gate 61 is connected to the first input terminal of switch 62 and to an inverter gate 63 for inverting the output of gate 61. The output of inverter gate 63 is connected to the second input terminal of switch 62. Switch 62 is a valve type switch making it possible for device 10 to work with valves 22 which are either normally open or normally closed. The inputs of inverter gates 64, 65 and 66 are connected to the common terminal of switch 62. The outputs of inverter gates 64, 65 and 66 are tied together in parallel to a one-eighth watt, 390 ohm resistor 67. Resistor 67 is in turn connected to the cathode of a light emitting diode 68 for indicating when solenoid valve 22 is on. Resistor 67 limits the current through diode 68. The anode of diode 68 is connected to junction point 69 from which +5 volt supply can be accessed. It should be appreciated that gates 64, 65 and 66 share the load of driving diode 68. When the output at the common terminal of switch 62 is high, inverter gates 64, 65 and 66 turn diode 68 on when their outputs go low.

The common terminal of switch 62 is connected to the gate terminal of a logic level field effect, N channel MOSFET transistor 70. In the most preferred form, transistor 70 is manufactured by International Rectifier of El Segundo, California under part number IRLZ34N.

The source terminal of transistor 70 is connected to the common of voltage source 36. The drain terminal of transistor 70 is connected to terminal 71 and the anode of a diode 72 of the axial rectifier, standard recovery type. The cathode of diode 72 is connected to junction point 31 which in turn is connected to terminal 73. Diode 72 is provided to prevent the kick back from any coil such as of solenoid valve 22 connected across terminals 71 and 73 from destroying transistor 70 when that coil is turned off.

Logic level voltages, +5 volts (high) and 0.7 volts (low) are used at the gate terminal of transistor 70 to turn transistor 70 on or off respectively. When transistor 70 is on, then it sinks or connects current from terminal 71 to ground. When valve 22 is connected across terminals 71 and 73, a path from voltage source 26 to transistor 70 goes from source 26 through terminal 27, device 10, terminal 73, valve 22, terminal 71, transistor 70, and terminal 28 back to source 26. But for current to reach ground, transistor 70 has to be turned on. Therefore, when valve 22 is connected across terminals 71 and 73, solenoid valve 22 has current passing through it when transistor 70 is on and has no current passing through it when transistor 70 is off.

Now that the basic construction of device 10 according to the preferred teachings of the present invention has been explained, an exemplary mode of operation can be set forth. Device 10 of the preferred embodiment of the present invention involves two signal inputs and one output. One signal input is connected to terminals 42 and 43 indicating that cooling is required and that fan clutch 20 should be engaged. This actuation signal input is from system 23 and can come from conventional approaches, such as an engine control module, a thermostat switch, or similar device. The other signal input is the determination that fan 16 is rotating. In the most preferred form of the present invention, this "fan rotating" input is provided by vacuum switch 24. The output of device 10 is via terminals 71 and 73 for operating items such as solenoid valve 22 for engaging and disengaging fan clutch 20.

Specifically, it can be appreciated that device 10 according to the preferred teachings of the present invention can be considered divided into functional provisions for purposes of explanation. Specifically, device 10 according to the teachings of the present invention intercepts the input signal normally sent by system 23 directly to valve 22 indicating that engagement of the rotational control apparatus in the preferred form of a fan clutch 20 is desired to rotate the output or in other words that cooling is requested. Particularly, terminals 42 and 43 receive the first input from system 23. Resistors 44, 46 and 48, opto-isolator 45, diode 47, gate 50, switch 51, and capacitor 52 of the preferred form generally act as provisions 95 for conditioning the first input received by terminals 42 and 43 and passing the conditioned input simultaneously to a timer 96 and to a controller 97. Light emitting diode 47 of provisions 95 provides visual indication that the first input was received by terminals 42 and 43. Additionally, switch 51 of provisions 95 allows the first input to be conditioned by provisions 95 whether the first input is in the form of a signal or is in the form of an interruption of a signal. Timer 96 is generally composed in the preferred form of resistor 54, multivibrator 55, and capacitor 76 and provides a time delay signal to controller 97 until a delay time has passed. Controller 97 is generally composed in the preferred form of gates 56, 58 and 61, resistor 57 and capacitor 59. Vacuum switch 24 senses the rotation of the output of fan clutch 20 and of fan 16 and provides a second input to controller 97. Device 10 provides an actuation output to terminals 71 and 73 connected to valve 22 controlling the actuation of fan clutch 20 by way of provisions 98 which in the preferred form generally includes switch 62, gates 63–66, resistor 67, diodes 68 and 72, and transistor 70. In particular, the actuation output to thereby rotate fan 16 in the most preferred form is provided to terminals 71 and 73 by provisions 98 in the event that controller 97 determines that the first input is received by terminals 42 and 43 and the time delay signal has been provided by timer 96 (whether or not the second input is provided by switch 24) and also in the event that controller 97 determines that the first input is received by terminals 42 and 43, the time delay signal of timer 96 has expired, and also the second input of switch 24 has been provided. It should further be appreciated that if one or both of the first and second inputs are interrupted after the time delay signal provided by timer 96 has expired, then the actuation output to terminals 71 and 73 is also interrupted such that actuation of the fan clutch 20 will be discontinued. Light emitting diode 68 of provisions 98 provides visual indication that the actuation output is being provided to terminals 71 and 73. Additionally, switch 62 of provisions 98 allows the actuation output provided to terminals 71 and 73 to operate solenoid valve 22 whether it is normally open or normally closed.

Figure 3:
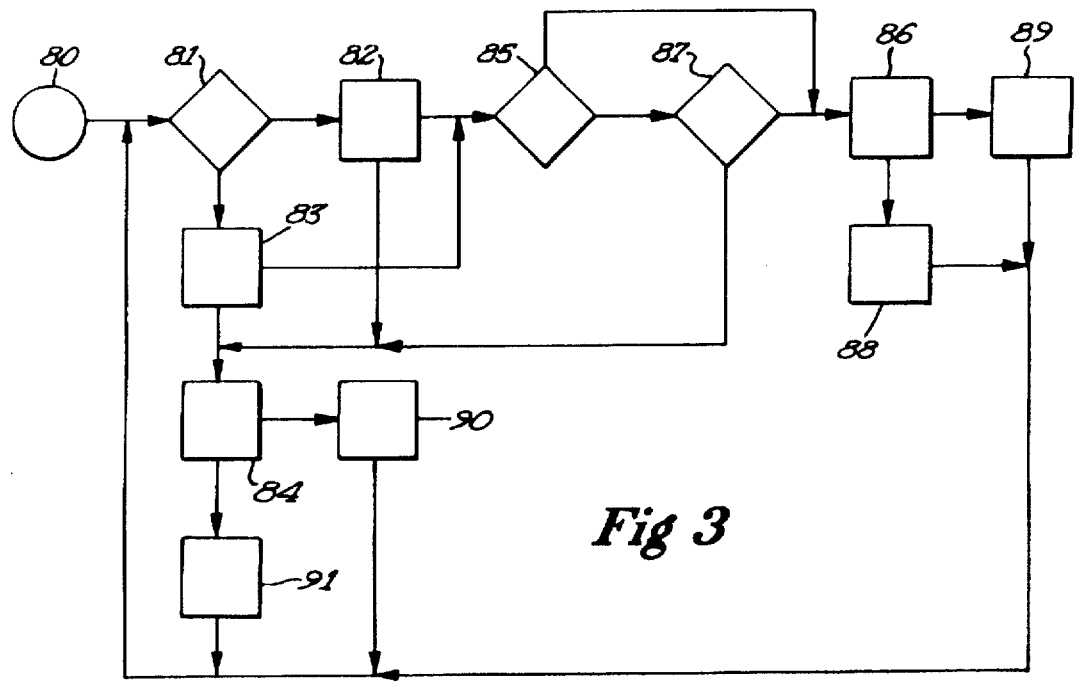
FIG. 3 shows a flow chart for a mode of operation of the overheating protection device of FIG. 1.

The operation of device 10 is also depicted in a flow chart shown in FIG. 3. Specifically, after starting, which is represented by the circle 80, device 10 determines a signal input from terminals 42 and 43 and depicted by the diamond 81. It should be appreciated that the signal indicating that cooling is required can be in the form of providing current through or voltage across terminals 42 and 43 or interrupting current through or voltage across terminals 42 and 43, depending upon the type of valve 22, system 23, and fan clutch 20 being used. Switch 51 is connected between the first input and common terminals in a normal logic when current through terminals 42 and 43 indicates that cooling is desired. Switch 51 is connected between the second input and common terminals in a reverse logic when interruption of current or voltage through or across terminals 42 and 43 indicates that cooling is desired. In any event, the next step in the operation is the determination of the setting of switch 51 as depicted by squares 82 and 83. Specifically, if no current or voltage is present through or across terminals 42 and 43 as depicted by square 83, and switch 51 is set for normal logic, then the signal passes directly to switch 62 as depicted by square 84. If no current or voltage is present through or across terminals 42 and 43 as depicted by square 83 and switch 51 is set for reverse logic, then the signal passes on to the time delay as depicted by diamond 85. Alternately, if current or voltage is present through or across terminals 42 and 43 as depicted by square 82 and switch 51 is set for reverse logic, then the signal passes directly to switch 62 as depicted by square 84. If a signal is present, i.e. current through or voltage across, at terminals 42 and 43, as depicted by square 82 and switch 51 is set for normal logic, then the signal passes on to the time delay as depicted by diamond 85.

When the signal passes on to the time delay as depicted by diamond 85, if the time delay has not expired, the signal passes directly to switch 62 as depicted by square 86. Similarly, if the time delay has expired, the signal passes on to switch 24 as depicted by diamond 87. If vacuum switch 24 is closed indicating that fan 16 is rotating, then the signal also passes to switch 62 as depicted by square 86. If valve 22 is normally open, switch 62 connects the second input and common terminals such that transistor 70 is turned off as depicted by square 88 interrupting current to solenoid valve 22 to thereby deenergize solenoid valve 22. Likewise, if valve 22 is normally closed, switch 62 connects the first input and common terminals such that transistor 70 is turned on as depicted by square 89 applying current to solenoid valve 22 to thereby energize solenoid valve 22. The process then flows back to the top of the chart depicted by diamond 81.

If the signal passes to switch 62 as depicted by square 84 and if valve 22 is normally open, switch 62 connects the second input and common terminals such that transistor 70 is turned on as depicted by square 90, applying current to solenoid valve 22 to thereby energize solenoid valve 22. Likewise, if valve 22 is normally closed, switch 62 connects the first input and common terminals such that transistor 70 is turned off as depicted by square 91 interrupting current to solenoid valve 22 to thereby deenergize solenoid valve 22. The process then flows back to the top of the chart depicted by diamond 81. The time delay override depicted in the process of moving directly from diamond 85 to square 86 of the process is necessary to give fan 16 time to initially get up to speed for moving air which can be sensed by switch 24 before the input of whether fan 16 is rotating is considered.

It can now be appreciated that device 10 according to the preferred teachings of the present invention interrupts actuation of fan clutch 20 to the engage condition and prevents the engagement of fan clutch 20 in the event that fan 16 is unable to rotate for any reason, such as interference of radiator 14 and/or shroud 18 with fan 16, bearing failure in fan clutch 20, and other like conditions. If fan 16 were unable to rotate but fan clutch 20 was continuously engaged, the resulting heat generated by the slippage between the input and the output of fan clutch 20 could ruin fan clutch 20 or otherwise shorten its operational life and could result in overheating of the surrounding components of engine 12 such as the fan belts connected to the input of fan clutch 20. It should further be appreciated that device 10 can be easily retrofitted for use with existing fan clutches 20 by simple insertion in the prior electrical connections to intercept the cooling request signal between already existing system 23 and already existing valve 22 and is operable for all combinations of types of fan clutches 20, valves 22 and systems 23.

Now that the basic teachings of the present invention have been explained, many extensions and variations will be obvious to one having ordinary skill in the art. For example, in the preferred form, device 10 according to the teachings of the present invention incorporates several unique features offering needed capabilities for over the road truck and similar applications and it is believed that such incorporation produces synergistic results. However, it can be appreciated that such features can be utilized separately or in a variety of other combinations according to the teachings of the present invention.

Likewise, although described for operation of fan clutch 20 of a fluid actuated type in the most preferred form, device 10 can be constructed according to the teachings of the present invention for providing overheating protection for other types of clutch actuation including electric. Although in the most preferred form device 10 disengages fan clutch 20 in the event that rotation of fan 16 is not sensed, overheating protection could be accomplished by device 10 according to the preferred teachings of the present invention by other processes including but not limited to stopping engine 12 and in at least certain environments would be highly unique and advantageous.

Similarly, in the preferred form of the present invention, fan rotation is determined by sensing changes of pressure as the result of fan rotation which is believed to be advantageous. However, fan rotation could be sensed by other methods including but not limited to sensing air flow or speed produced by fan 16, sensing the pressure differential across radiator 14, and sensing the rotation of the output of fan clutch 20 and/or fan 16 by other means including but not limited to electrically or photographically, and in at least certain environments would be highly unique and advantageous.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Device for interrupting the engagement of a rotational control apparatus having a rotatable output in the event that the output is not free to rotate comprising, in combination: input terminals for receiving a first input indicating that engagement of the rotational control apparatus is desired to rotate the output; a controller; a timer for providing a time delay signal to the controller until a delay time has expired; means for conditioning the first input received by the input terminals and for passing the conditioned input to the timer and simultaneously to the controller; means for sensing the rotation of the output of the rotational control apparatus and providing a second input to the controller; and means for providing an actuation output to the rotational control apparatus for engaging the rotational control apparatus in the event that the first input is received and the time delay signal has been provided to the controller and in the event that the first input is received, the time delay has expired, and the second input has been provided to the controller.

2. The device of claim 1 wherein the controller comprises, in combination: a first gate having first and second inputs and an output, with the first input of the first gate receiving the conditioned signal and the second input of the first gate receiving the second input; and a second gate having first and second inputs and an output, with the first input of the second gate receiving the time delay signal and the second input of the second gate being connected to the output of the first gate, with the output of the second gate being connected to the actuation output providing means.

3. The device of claim 2 wherein the timer comprises a multivibrator.

4. The device of claim 3 wherein the conditioning means includes means for visually indicating that the first input was received by the input terminals.

5. The device of claim 2 wherein the terminals receive the first input of either a first type or a second type, with the first type being in the form of a signal and the second type being in the form of an interruption of a signal; and wherein the conditioning and passing means includes an input logic switch having a first position for passing the first input to the controller and the timer in the event that the first input is of the first type and a second position for passing the first input to the controller and the timer in the event that the first input is of the second type.

6. The device of claim 2 wherein the conditioning and passing means comprises, in combination: an opto-isolator.

7. The device of claim 2 wherein the rotational control apparatus is actuable by fluid pressure controlled by a solenoid valve, with the solenoid valve being either normally open or normally closed; and wherein the actuation output providing means includes a valve type switch having a first position in the event the solenoid valve is normally open and a second position in the event the solenoid valve is normally closed.

8. The device of claim 7 wherein the actuation output providing means comprises, in combination: a logic level field effect transistor.

9. Method for interrupting the engagement of a rotational control apparatus having a rotatable output in the event that the output is not free to rotate comprising the steps of: receiving a first input indicating that engagement of the rotational control apparatus is desired to rotate the output; providing a controller; providing a timer for providing a time delay signal to the controller until a delay time has expired; conditioning the received first input and passing the conditioned input to the timer and simultaneously to the controller; sensing the rotation of the output of the rotational control apparatus and providing a second input to the controller; and providing an actuation output to the rotational control apparatus for engaging the rotational control apparatus in the event that the first input is received and the time delay signal has been provided to the controller and in the event that the first input is received, the time delay has expired and the second input has been provided to the controller.

10. The method of claim 9 wherein the receiving step comprises the step of receiving the first input of either a first type or a second type, with the first type being in the form of a signal and the second type being in the form of an interruption of a signal; and wherein the conditioning and passing step comprises the steps of: providing an input logic switch having a first position for passing the first input to the controller and the timer in the event that the first input is of the first type and a second position for passing the first input to the controller and the timer in the event that the first input is of the second type; and positioning the input logic switch in one of the first and second positions according to the type of the first input to be received.

11. The method of claim 10 wherein the rotational control apparatus is actuable by fluid pressure controlled by a solenoid valve, with the solenoid valve being either normally open or normally closed; and wherein the actuation output providing step comprises the steps of: providing a valve type switch having a first position in the event the solenoid valve is normally open and a second position in the event the solenoid valve is normally closed; and positioning the valve type switch in one of the first and second positions according to the type of the solenoid valve controlling the fluid pressure.

12. The method of claim 11 wherein the rotational control apparatus includes a fan rotatable with the output, with rotation of the fan moving air resulting in a change in pressure from ambient pressure; and wherein the second input providing means comprises the step of providing a pressure switch for sensing the change in pressure resulting from the rotation of the fan.

13. Device for use with an internal combustion engine including a cooling system having a radiator through which coolant is circulated, with the radiator including a shroud, with a fan located in and rotatable within the shroud spaced from the radiator for moving air through the radiator, with rotation of the fan moving air in the shroud through the radiator causing a pressure change inside of the shroud from the pressure outside of the shroud, comprising, in combination: means for sensing the pressure inside of the shroud; and means for interrupting the rotation of the fan in the event that the pressure change inside of the shroud is not sensed by the sensing means.

14. The device of claim 13 wherein the fan draws air through the radiator and the shroud; and wherein the sensing means comprises a vacuum switch.

15. The device of claim 14 wherein the fan is mounted on the output of a fan clutch having a rotating input, with the fan clutch being actuable from a disengaged condition where the input is free to rotate independent of the output to an engaged condition where the input is rotatably connected to the output; and wherein the interrupting means comprises means for moving the clutch from the engaged condition to the disengaged condition in the event that the pressure change inside of the shroud is not sensed by the sensing means.

16. The device of claim 15 wherein the interrupting means further comprises, in combination: means for delaying the moving means from moving the fan clutch from the engaged condition for a period of time sufficient after the fan clutch is moved from the disengaged condition to the engaged condition for the rotation of the fan to cause the pressure change inside of the shroud.

17. The device of claim 15 wherein the fan clutch includes means for providing an actuation input requesting that the output of the fan clutch be rotated by actuating the fan clutch; and wherein the interrupting means includes means for intercepting the actuation input, with the intercepting means being operable for both when the actuation input providing means provides a signal to actuate the fan clutch or when the actuation input providing means interrupts a signal to actuate the fan clutch.

18. The device of claim 17 wherein the fan clutch is actuable by fluid pressure controlled by a solenoid valve; and wherein the intercepting means is operable for both when the solenoid valve is normally open or is normally closed.

19. The device of claim 18 wherein the intercepting means is operable for both when the fan clutch is fluid engaged or is fluid disengaged.

20. Device for a rotational control apparatus having a rotating input and a rotatable output, with the rotational control apparatus being actuable from a disengaged condition where the input is free to rotate independent of the output to an engaged condition where the input is rotatably connected to the output, comprising, in combination: means for sensing rotation of the output of the rotational control apparatus; and means for interrupting actuation of the rotational control apparatus to the engaged condition in the event that rotation of the output of the rotational control apparatus is not sensed by the sensing means.

21. The device of claim 20 wherein the output of the rotational control apparatus includes a fan for moving air; and wherein the sensing means comprises means for sensing movement of air.

22. The device of claim 21 wherein the interrupting means includes means for delaying interrupting actuation of the rotational control apparatus for a period of time sufficient for the fan to move air which can be sensed by the sensing means.

23. The device of claim 22 wherein the fan moves air through a radiator, with the radiator including a shroud, with the fan located in the shroud spaced from the radiator, with air moving in the shroud through the radiator by rotation of the fan causing a pressure change inside of the shroud from the pressure outside of the shroud; and wherein the sensing means comprises means for sensing the pressure inside of the shroud.

24. The device of claim 23 wherein the fan draws air through the radiator and the shroud; and wherein the sensing means comprises a vacuum switch.

25. The device of claim 24 wherein the rotational control apparatus is actuable by fluid pressure controlled by a solenoid valve movable between an actuation position and a nonactuation position; and wherein the interrupting means moves the solenoid valve from the actuation position to the nonactuation position.

26. The device of claim 20 wherein the rotational control apparatus includes means for providing an actuation input requesting that the output of the rotational control apparatus be rotated by actuating the rotational control apparatus; and wherein the interrupting means includes means for intercepting the actuation input, with the intercepting means being operable for both when the actuation input providing means provides a signal to actuate the rotational control apparatus or when the actuation input providing means interrupts a signal to actuate the rotational control apparatus.

27. The device of claim 26 wherein the rotational control apparatus is actuable by fluid pressure controlled by a solenoid valve; and wherein the intercepting means is operable for both when the solenoid valve is normally open or is normally closed.

28. The device of claim 27 wherein the intercepting means is operable for both when the rotational control apparatus is fluid engaged or is fluid disengaged.

29. The device of claim 26 wherein the actuation input is in the form of an electric current having polarity; and wherein the intercepting means is operable for both when the intercepting means is connected to the input providing means with the same polarity or reversed polarity as the electric current.

30. The device of claim 20 wherein the rotational control apparatus includes means for providing an actuation input requesting that the output of the rotational control apparatus be rotated by actuating the rotational control apparatus; and wherein the interrupting means includes means for intercepting the actuation input; wherein the rotational control apparatus is actuable by fluid pressure controlled by a solenoid valve; and wherein the intercepting means is operable for both when the solenoid valve is normally open or is normally closed.

31. The device of claim 30 wherein the intercepting means is operable for both when the rotational control apparatus is fluid engaged or is fluid disengaged.

32. The device of claim 20 wherein the rotational control apparatus includes means for providing an actuation input requesting that the output of the rotational control apparatus be rotated by actuating the rotational control apparatus; and wherein the interrupting means includes means for intercepting the actuation input; wherein the rotational control apparatus is fluid actuated; and wherein the intercepting means is operable for both when the rotational control apparatus is fluid engaged or is fluid disengaged.

33. Method for interrupting the engagement of a rotational control apparatus having a rotatable output in the event that the output is not free to rotate comprising the steps of: providing means rotatable with the output for moving air resulting in a change in pressure from ambient pressure; sensing rotation of the output after the engagement of the rotational control apparatus by sensing the change in pressure resulting from the rotation of the air moving means; and interrupting the engagement of the rotational control apparatus in the event that rotation of the output of the rotational control apparatus is not sensed.

34. Method for controlling a fan for an internal combustion engine including a cooling system having a radiator through which coolant is circulated, with the radiator including a shroud, comprising the steps of: rotating the fan located within the shroud spaced from the radiator for moving air through the radiator, with movement of air in the shroud through the radiator causing a pressure change inside of the shroud from the pressure outside of the shroud; sensing the pressure inside of the shroud; and interrupting the rotation of the fan in the event that the pressure change inside of the shroud is not sensed.

* * * * *